US007962563B2

(12) United States Patent
Becker-Szendy et al.

(10) Patent No.: US 7,962,563 B2
(45) Date of Patent: Jun. 14, 2011

(54) SYSTEM AND METHOD FOR MANAGING STORAGE SYSTEM PERFORMANCE AS A RESOURCE

(75) Inventors: Ralph Attila Becker-Szendy, Los Gatos, CA (US); Richard Andrew Golding, San Francisco, CA (US); Caixue Lin, Santa Cruz, CA (US); Theodore Ming-Tao Wong, Mountain View, CA (US); Ahmed Zaki Omer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/388,524

(22) Filed: Mar. 24, 2006

(65) Prior Publication Data

US 2007/0226332 A1      Sep. 27, 2007

(51) Int. Cl.
*G06F 15/16*      (2006.01)
(52) U.S. Cl. .......................................... 709/212; 710/36
(58) Field of Classification Search .................. 709/212, 709/226; 719/313, 320; 710/1, 20, 36, 352, 710/54, 58, 60
See application file for complete search history.

(56) References Cited

U.S. PATENT DOCUMENTS

| 6,434,631 B1 | 8/2002 | Bruno et al. |
| 6,725,456 B1 | 4/2004 | Bruno et al. |
| 6,779,181 B1 | 8/2004 | Yu et al. |
| 7,260,703 B1* | 8/2007 | Moore et al. ................. 711/203 |
| 2003/0046396 A1 | 3/2003 | Richter et al. |
| 2003/0237084 A1 | 12/2003 | Neiman et al. |
| 2004/0202319 A1 | 10/2004 | Hussain et al. |
| 2005/0060558 A1 | 3/2005 | Hussain et al. |
| 2005/0165881 A1* | 7/2005 | Brooks et al. ................. 709/200 |

OTHER PUBLICATIONS

J. Bruno, et al., "Disk Scheduling with Quality of Service Guarantees," IEEE 1999, pp. 400-405.
P. Goyal, et al., "Start-time Fair Queuing a Scheduling Algorithm for Integrated Services Packet Switching Networks," Proceedings of SIGCOMM 1996.
S. Shenker, et al., "Specification of Guaranteed Quality of Service," Network Working Group, Request for Comments: 2212, Category: Standards Track, 1997.
P. Goyal, et al., "Cello: A Disk Scheduling Framework for Next Generation Operating Systems." SIGMETRICS 1998.
J. C. Wu et al., "Hierarchical Disk Sharing for Multimedia Systems," NOSSDAV'05, Jun. 13-14, 2005.

* cited by examiner

*Primary Examiner* — William C Vaughn, Jr.
*Assistant Examiner* — Scott Christensen
(74) *Attorney, Agent, or Firm* — Shimokaji & Associates, P.C.; Samuel Kassatly

(57) ABSTRACT

A scheduler selects an I/O from a session of a pool and updates token buckets associated with resource limits and reserves for the session and the pool and statistics used in determining fair sharing. To select an I/O, the scheduler identifies sessions with a non-empty queue, identifies head I/Os in the queues, computes for the head I/O a deadline using session and pool reserve buckets and a release time using session and pool limit buckets, and selects a head I/O with an earliest deadline that is past the release time. If the deadline of the selected candidate head I/O is in the past, the scheduler transfers the selected head I/O to the tail of the storage device queue. Otherwise, the scheduler selects the pool with the least amount of I/O traffic according to a session fair share estimator.

23 Claims, 6 Drawing Sheets

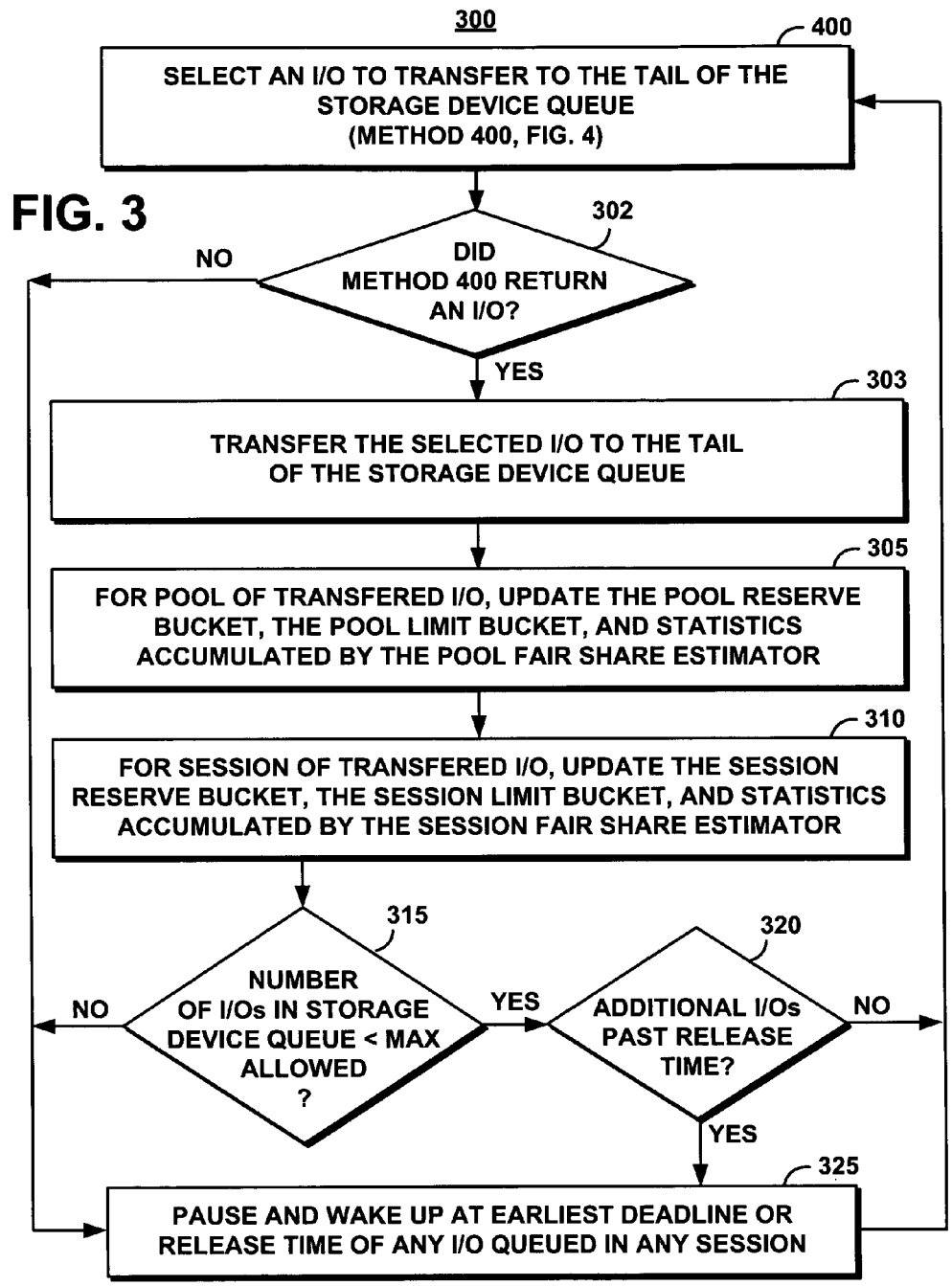

SYSTEM AND METHOD FOR MANAGING STORAGE SYSTEM PERFORMANCE AS A RESOURCE

FIELD OF THE INVENTION

The present invention generally relates to data processing. More particularly, this invention pertains to providing an efficient and proportional allocation of processing and queuing resources according to limits, reserves, and fair shares of those resources.

BACKGROUND OF THE INVENTION

Companies looking to reduce the high cost of storage often aggregate data onto shared virtualized storage systems, reducing infrastructure and management overhead of storage systems. Although this technology has proven to be useful, it would be desirable to present additional improvements. Aggregating data onto shared virtualized storage systems can lead to unexpected interference between applications with potentially divergent performance requirements. For example, one user may be running a media player with deadlines when another user starts a storage-intensive file indexer. If the two users share a storage device, then the storage applications compete with each other for performance resources, which may result in missing deadlines by the media player. On a larger scale, a transaction-processing application may experience performance degradation when a backup process begins. Such competition is not a rare occurrence, and likely becomes more frequent as a storage system grows and as more applications share the resources within the storage system.

One conventional approach to managing storage system resources dedicates a storage device or logical unit to an application. This approach isolates applications at the cost of complex manual configuration and inefficient resource utilization. Moreover, configurations are usually based on a snapshot of application behavior, and require new analysis as either the application requirements or the hardware infrastructure change.

A virtualized storage system therefore is required to provide assurances that the behavior of one application does not interfere with the performance of other applications. One conventional storage system manages the resources allocated to an application according to a specification of reserves and limits. A reserve specifies the amount of a resource whose availability the conventional storage system guarantees for the application. A limit restricts the additional amount of a resource that the conventional storage system provides to the application if unused resources exist. The limit can be used, for example, to ensure that housekeeping operations or backup do not use more than a certain amount of system performance, leaving the remainder of the resources for regular applications.

FIG. 5 illustrates a conventional storage system 500 comprising a storage device 505. The storage system 500 provides virtualized storage in a distributed system in the form of sessions 510 and pools 515. Sessions 510 comprise session 1, 520, session 2, 525, session 3, 530, session 4, 535, through session N, 540. Pools 515 comprise pool 1, 545, pool 2, 550, through pool M, 555. An application forms one or more of the sessions 510 to utilize resources in the storage device 505. The storage device 505 enforces isolation locally between applications that share the storage device 505. Internally, the storage system 500 places data on the storage device 505 such that the storage system 500 delivers reasonable overall performance, and reorganizes data in response to changes in the application behavior or the infrastructure.

Each storage device 505 in the storage system 500 has the following goals for managing its performance resources:

Reserve enforcement—An active application receives at least its reserve amount or reservation resource on average from the storage device 505, regardless of the behavior of any other applications.

Limit enforcement—An application receives at most its limit amount or limit resource on average from the storage device 505.

Fair sharing of additional resources—Each active application receives a fair share of any unused resources on the storage device 505.

Pools 515 represent a virtual entity that is generally associated with a single application or user of the storage device 505. Pools 515 encapsulate the reservation resources and limit resources of the storage device 505 that are used by an application. Although conventional performance resource management technology has proven to be useful, it would be desirable to present additional improvements.

Within each of the pools 515, each application may subdivide into sessions 510 resources in one of the corresponding pools 515 assigned to the application. Each of the sessions 510 is associated with an instance of an application that subdivides the resource allocation of an associated pool.

The problem of managing I/O performance resources can be divided into separable problems: how to specify allocations for pools and sessions, and how to deliver on those allocations. Delivering performance resources combines issues of soft real-time scheduling for fulfillment of reserves and of sharing extra resources fairly.

Traditional quality of service (QoS) resource allocation models support potentially additional levels of specification; for example, a reserve, a limit, and points in between. For each level, the specification sets the performance that the system is required to guarantee. Simple conventional models support only a single level and use metrics such as bandwidth to express requirements. More complex conventional models use benefit-value or utility functions to express requirements, and the system uses these functions to maximize the overall benefit or utility over all applications while ensuring that minimum levels are met. The user or application is required to specify the function, which is often difficult.

Several conventional hierarchical allocation models exist for resource management. Generalized models exist for the management of additional resources. Models also exist for CPU scheduling and network sharing. Most of these examples support arbitrary hierarchy depths.

One conventional allocation model utilizes an I/O scheduling algorithm with an arbitrary hierarchy of token buckets to provide proportional resource guarantees to applications. This conventional approach allows applications to borrow performance from other applications that are not using their share of performance, but does not address fair sharing of best-effort performance. This conventional approach further requires a priori knowledge of the actual device throughput under the current workload.

Additional conventional approaches utilize disk schedulers that support a mix of multimedia and non-multimedia applications. One such conventional system gives priority to best-effort streams, delaying real-time I/Os as long as possible without violating their requirements. Other such conventional systems implement a two-level hierarchy of schedulers for additional classes of traffic. However, these approaches require detailed information (such as their periodicities) about the application workloads. Other conventional approaches often assume that no other applications access the storage, which allows for greater optimization in algorithm design but does not provide adequate fair sharing of resources.

Other conventional approaches control other storage system characteristics, most notably response time. One such approach uses an earliest-deadline-first (EDF) scheduler that bases the deadline of an I/O on the response time requirement of its stream, with adaptive mechanisms to adjust the response time target as the offered load of the stream changes. Another such approach provides per-stream I/O rate throttling so that all streams receive specified response latencies. This approach is adaptive: a central server monitors the performance each stream is receiving and changes the acceptable rates for other streams when one stream is getting response time longer than its requirement.

Several conventional alternatives exist for sharing performance resources from storage devices, many of which are related to methods for sharing CPU cycles and network bandwidth. One conventional system supports proportional sharing of resources among additional users, and includes a hierarchical approach for defining the shares. Another conventional system gives each active I/O stream a share of resources in proportion to its weight relative to any other active streams. However, these approaches do not give each active stream its requested reserve of resources regardless of the demands of other streams.

What is needed is a performance resource management system that enforces fair sharing with reservation and limit enforcement. Conventional approaches to performance resource management perform reserve and limit enforcement. Some conventional approaches further perform fair sharing in which each application receives an equivalent amount of additional resources. What is needed is a performance resource management system that further performs fair sharing of additional resource proportionately, in accordance with a priority assigned to an application, such that a higher priority application with deadlines such as a media player receives more resources than a lower priority application such as a file indexer or backup. Such a system is needed that further treats the storage device as a "black box", without requiring detailed modeling of the storage devices.

Thus, there is a need for a system, a computer program product, and an associated method for managing storage system performance as a resource. The need for such a solution has heretofore remained unsatisfied.

SUMMARY OF THE INVENTION

The present invention satisfies this need, and presents a system, a service, a computer program product, and an associated method (collectively referred to herein as "the system" or "the scheduler") for managing storage system performance as a resource. The storage system comprises pools and sessions. The scheduler selects an I/O from one of the sessions to transfer to a tail of a storage device queue, updates a pool reserve bucket, a pool limit bucket, and pool statistics accumulated by a fair share estimator of the pool associated with the session of the selected I/O, and updates a session reserve bucket, a session limit bucket, and session statistics accumulated by a session fair share estimator of the session of the selected I/O to manage performance resources.

To select an I/O from one of the sessions, the scheduler examines the sessions to identify at least one candidate session with a non-empty queue, identifies a head I/O in the non-empty queue of the candidate session, computes a deadline for the identified head I/O using the reserve buckets of the candidate session and the pool of the candidate session, computes a release time for the identified head I/O using the session limit buckets of the candidate session and the pool of the candidate session, and selects from the identified head I/Os a head I/O with an earliest deadline that is past the release time. If the deadline of the selected candidate head I/O is in the past, the scheduler transfers the selected head I/O to the tail of the storage device queue. If the deadline of the selected candidate head I/O is not in the past, the scheduler selects the pool with the least amount of I/O traffic according to a pool fair share estimator, selects the session within that pool with the least amount of I/O traffic according to a session fair share estimator, selects a head I/O from a queue in the selected session, and transfers the selected head I/O to a tail of the storage device queue.

The scheduler may be embodied in a utility program such as a scheduler utility program. The scheduler provides a method for the user to identify a session limit, a session reserve, a pool limit, and a pool reserve by for use in managing performance resources. The user invokes the scheduler utility to manage performance resources such as, for example I/Os.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is a process flow chart illustrating a method of operation of the scheduler of FIGS. 1 and 2 in managing resources with respect to limits, reserves, and fair sharing;

DETAILED DESCRIPTION OF PREFERRED EMBODIMENTS

The following definitions and explanations provide background information pertaining to the technical field of the present invention, and are intended to facilitate the understanding of the present invention without limiting its scope:

Deadline: A time by which an I/O is required to be executed for an associated session and pool to receive a predetermined reserve.

Pool: A long-term virtual entity that an administrator generates to manage a resource such as I/Os for an application. The administrator controls the amount of resources allocated for the pool.

Release time: A time after which an I/O can be executed without an associated session and pool exceeding a predetermined limit.

Session: a short-term virtual entity that an application process creates from within a pool to manage a resource such as one stream of I/Os.

Figure 1:
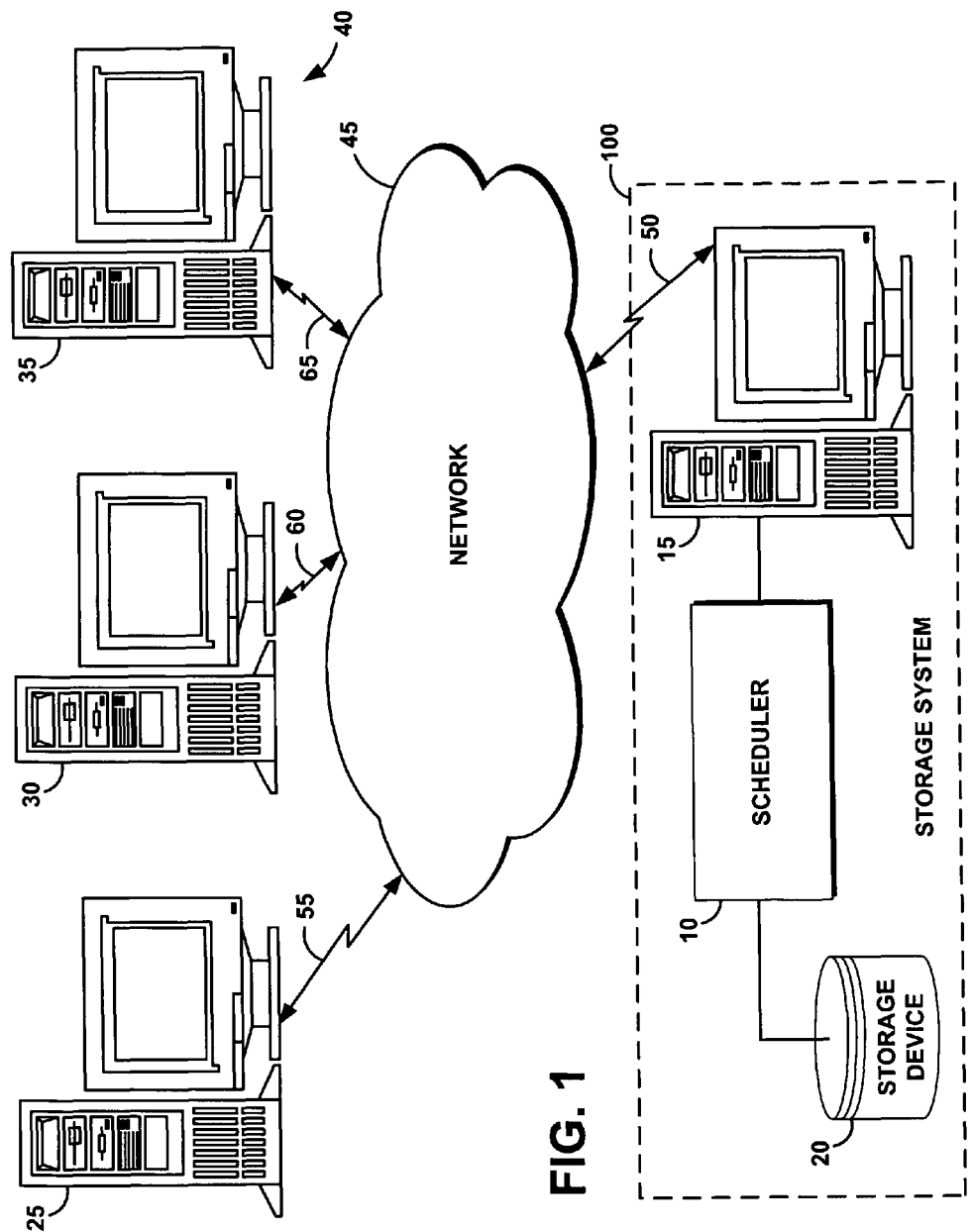
FIG. 1 is a schematic illustration of an exemplary storage system environment in which a scheduler of the present invention can be used.

FIG. 1 portrays an exemplary overall environment in which a system, a service, a computer program product, and an associated method (the "scheduler" 10 or the "system 10") for managing performance of a storage system 100 as a resource according to the present invention may be used. Storage system 100 comprises scheduler 10, a computer 15, and a storage device 20. Scheduler 10 comprises a software programming code or a computer program product that is typically embedded within, or installed on computer 15. Alternatively, scheduler 10 can be saved on a suitable storage medium such as a diskette, a CD, a hard drive, or like devices.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Users or applications (generally referenced herein as applications) are represented by a variety of computers such as computers 25, 30, 35, (collectively referenced as applications 40) and can access the storage system 100 through a network 45. Computers 25, 30, 35 each comprise software that allows applications 40 to interface securely with the computer 15. The computer 15 is connected to network 45 via a communications link 50 such as a telephone, cable, or satellite link. Computers 25, 30, 35, can be connected to network 45 via communications links 55, 60, 65 respectively. While scheduler 10 is described in terms of network 45, computers 25, 30, 35 may also access scheduler 10 locally rather than remotely. Computers 25, 30, 35 may access scheduler 10 either manually, or automatically through the use of an application.

The storage device 20 may comprise one or more storage individual storage devices configured together. The computer 15 may comprise one or more computers configured together to form a set of clients or servers used to manage the storage device 20 on behalf of the applications 40.

In one embodiment, the storage system 100 provides virtualized storage in a distributed system that is built from many small, self-contained storage servers. Each storage server enforces isolation locally between applications that share the storage server. Internally, the storage system 100 places data on storage servers such that the storage system 100 delivers reasonable overall performance, and reorganizes data in response to changes in the behavior of the applications 40 or the infrastructure of the storage system 100.

The storage device 20 in the storage system 100 manages performance resources using reserve enforcement, limit enforcement, and fair sharing of additional resources. Reserve enforcement requires that each of the applications 40 that are active receive at least a predetermined reserve amount of a resource on average from the storage device 20, regardless of the behavior of any other applications. Limit enforcement requires that each of the active applications 40 receive at most a predetermined limit amount on average from the storage device 20. Fair sharing of additional resources requires that each of the active applications 40 receive a fair share of any unused resources on the storage device 20.

In one embodiment, scheduler 10 is layered over a disk or a RAID device that performs its own low-level head scheduling. In addition to managing performance resources, scheduler 10 keeps the storage device 20 busy with enough I/O requests to yield efficient head movement. Scheduler 10 further helps the storage device 20 take advantage of locality in the workload of an application by batching I/Os together. In another embodiment, scheduler 10 controls throughput over time intervals of approximately one second rather than providing hard real-time guarantees. Thus, scheduler 10 can treat the underlying storage device 20 essentially as a black box, unlike conventional approaches that model storage devices in detail.

Figure 2:
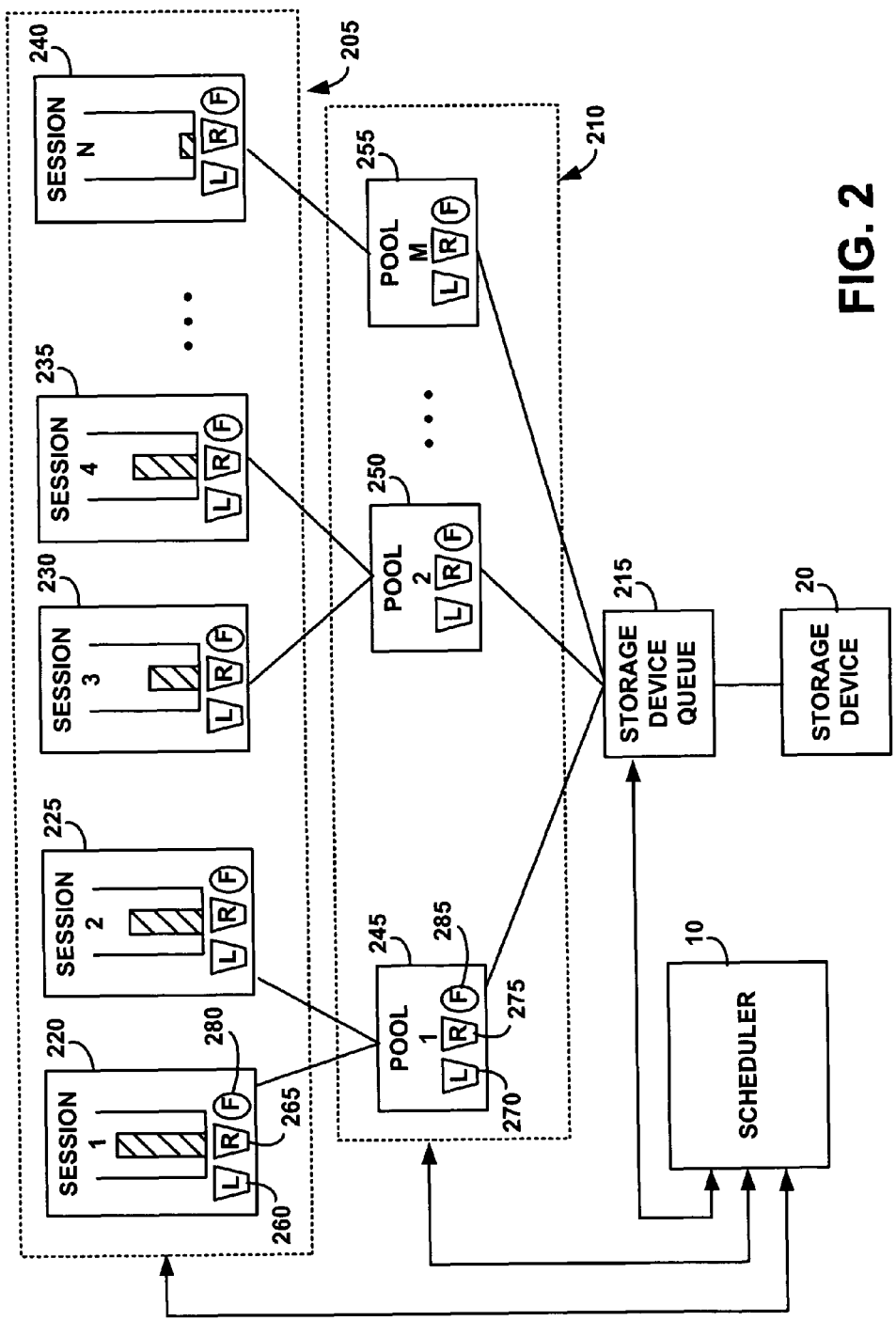
FIG. 2 is a block diagram of the high-level architecture of the scheduler and storage system of FIG. 1.

FIG. 2 illustrates a high-level data structure hierarchy of a storage system 100 comprising scheduler 10. The storage system 100 comprises sessions 205, pools 210, and a storage device queue 215. Sessions 205 comprise one or more sessions such as, for example, session 1, 220, session 2, 225, session 3, 230, session 4, 235, through session N, 240. Pools 210 comprise one or more pools such as, for example, pool 1, 245, pool 2, 250, through pool M, 255. Sessions 205 are associated with pools 210. For example, session 1, 220, and session 2, 225, are associated with pool 1, 245. Similarly, session 3, 230, and session 4, 235, are associated with pool 2, 250.

Scheduler 10 combines reserve and limit enforcement on I/O performance resource usage with fair sharing of best-effort resources. Scheduler 10 uses token buckets to track how close an application is to its limit and how far an application is operating below its reserve. Scheduler 10 also maintains one or more statistical measurements of recent performance that are used by a fair share estimator to determine how best to distribute any unused resources.

Each of the sessions 205 and each of the pools 210 comprise a pair of token buckets for a reserve value of a resource and a limit value of a resource. For example, session 1, 220, comprises a session limit bucket 260 and a session reserve bucket 265. Similarly, pool 1, 245 comprises a pool limit bucket 270 and a pool reserve bucket 275.

Each of the pools 210 and each of the sessions 205 comprise a fair share estimator such as a session fair share estimator 280 and a pool fair share estimator 285. Scheduler 10 uses the pool fair share estimators and the session fair share estimators to identify pools 210 and sessions 205 that have been receiving less than their fair share of available resources. In one embodiment, the pool fair share estimators and the session fair share estimators use a moving average of the recent amount of resources used by the sessions 205 and the pools 210. While a moving average is used for illustrative purposes only, it should be clear than any method or combination of methods may be used by scheduler 10 to estimate resource usage in the sessions 205 and the pools 210.

Scheduler 10 models performance resource allocation policies as a hierarchical arrangement of pools 210 and sessions 205. Each of the pools 210 is a long-term entity that an administrator generates to manage the I/Os for each of the applications 40. The administrator controls the amount of resources allocated for each of the pools 210. Each of the sessions 205 is a short-term entity that an application process creates from within one of the pools 210 to manage one stream of I/Os. Processes or applications 40 can create an arbitrary number of sessions 205 provided that the total amount of resources allocated for the sessions 205 does not exceed the amount allocated for an associated pool. For example, the administrator may configure one of the pools 210 for a media server application to support ten concurrent media streams across the files in a library of the server. Up to ten media player processes may open sessions to play one media stream for each media player process.

Each of the pools 210 or sessions 205 specifies a {reserve, limit} pair of requirements on an average received I/O rate, where the limit is greater than or equal to the reserve. Scheduler 10 guarantees that each of the applications 40 can execute I/Os at a rate up to a predetermined reserve. Scheduler 10 further allows each of the applications 40 to execute at a rate up to the predetermined limit when unused resources are available. These resources may be unreserved, be from other pools 210 or sessions 205 that are operating below their reserve voluntarily, or be from recent I/Os that execute more efficiently than expected. The reserve may be zero, meaning that all I/Os are best effort, while the limit may be infinite.

Pools 210 and sessions 205 specify their requirements in terms of I/O runs per second, rather than I/Os per second or bytes per second. An I/O run is a set of sequential I/Os, up to a fixed amount of data. In one embodiment, each run requires a disk head seek and rotation, thus a runs-per-second specification is a rough proxy for the disk utilization that a given requirement implies.

Feasible reserve and limit values for each of the pools 210 or sessions 205 depend on the resources available from the underlying storage device 20. The pools 210 in the storage system 100 are feasible if the sum of the reserves of the pools 210 does not exceed the worst-case I/O rate of the storage device 20, thus defining the admission criterion for pools 210. Similarly, the sessions 205 in each of the pools 210 are feasible if the sum of the reserves of the sessions 205 does not exceed the reserve each of the associated pools 210. Limit values are arbitrary, but scheduler 10 ensures that any of the sessions 205 do not receive more than the limit of any of the associated pools 210.

Scheduler 10 ensures that sessions 205 and pools 210 receive predetermined reserve I/O rates on average. Scheduler 10 further ensures that sessions 205 and pools 210 receive no more than predetermined limit I/O rates. To achieve these reserves and limits, scheduler 10 combines the characteristics of an earliest-deadline-first (EDF) algorithm with characteristics of slack-stealing algorithms for CPU schedulers and proportional-share schedulers. Scheduler 10 computes for each I/O a release time and a deadline. The release time is the time after which the I/O can be executed without its session and pool exceeding their limits. The deadline is the time by which the I/O is required to be executed for its session and pool to receive their reserves. The release time can never be later than the deadline, given that the limit is never lower than the reserve.

Scheduler 10 computes two release times using the session limit bucket 260 and associated pool limit bucket 270, and uses the later of the two as the release time of the I/O. Scheduler 10 computes two deadlines using the session reserve bucket 265 and the associated pool reserve bucket 275, and uses the earlier of the two as the deadline of the I/O. Scheduler 10 then determines which I/O has the earliest deadline. If two I/Os have the same deadline, the one with the earlier session deadline is chosen. If the I/Os have the same session deadline, then the system can choose either. If scheduler 10 finds that the deadline of the I/O with the earliest deadline has expired, scheduler 10 sends that I/O to the storage device 20 for execution. Otherwise, scheduler 10 takes advantage of the implicit slack in the schedule to execute other I/Os, selecting I/Os such that the unused resources are shared fairly among sessions 205 and pools 210.

Scheduler 10 maintains token buckets such as the session limit bucket 260 and the session reserve bucket 265 for each of the sessions 205. Scheduler 10 further maintains token buckets such as the pool limit bucket 270 and the pool reserve bucket 275 for each of the pools 210. System uses the token buckets to ensure that the sessions 205 and the pools 210 are staying within associated predetermined limits and reserves.

The session reserve bucket 265 measures how much session 1, 220 is operating below a predetermined reserve value. Similarly, the pool reserve bucket 275 measures how much pool 1, 245 is operating below a predetermined reserve value. Reserve buckets such as the session reserve bucket 265 and the pool reserve bucket 275 have a refill rate r equal to the reserve rate, or zero if there is no reserve. Scheduler 10 requires an I/O to run as soon as possible after the reserve bucket accumulates a token for the I/O, which sets the deadline at $(n-n_r)/r$ seconds into the future; n is the number of tokens the I/O requires, and $n_r$ is the number of tokens currently in the associated reserve bucket such as the session reserve bucket 265 and the pool reserve bucket 275.

The limit buckets such as the session limit bucket 260 and the pool limit bucket 270 track how close a session such as session 1, 220, or pool such as pool 1, 245, is to a predetermined limit. The limit bucket has a refill rate l equal to the limit rate, or +∞ if there is no limit. Scheduler 10 requires that an I/O wait until a limit bucket has accumulated a token for the I/O, which sets the release time at $(n-n_l)/l$ seconds into the future; n is the number of tokens the I/O requires, and $n_l$ is the number of tokens currently in the associated limit bucket such as the session limit bucket 260 and the pool reserve bucket 270.

Once active sessions 205 and pools 210 have received an associated reserve, the active sessions 205 and pools 210 receive additional best-effort resources such that the active sessions 205 and pools 210 tend to obtain the same I/O rate, subject to any limit constraints. Scheduler 10 supports fair sharing in a manner similar to a "water level"; fair sharing of scheduler 10 behaves as if extra resources are being "poured" into the pools 210. Consequently, scheduler 10 gives performance to the lowest of the pools 210 until all the pools 210 receive the same amount of resource. Similar resource sharing occurs among sessions 205 within each of the pools 210.

In one embodiment, scheduler 10 maintains a moving average of the recent performance of each of the sessions 205 and pools 210. Scheduler 10 in this embodiment keeps a window over approximately the last five seconds, for example, in 20 periods that are approximately a quarter-second in width. Scheduler 10 estimates a recent I/O rate by determining a weighted average over the periods:

$$T = \sum_{i=0}^{n} b_i \cdot \alpha^i$$

where $b_i$ is the I/O rate of the $i^{th}$ quarter-second period, and $\alpha$ is a decay factor. The variable n represents the number of buckets in the window minus, for example, 19.

If scheduler 10 determines that all releasable I/Os have deadlines in the future, scheduler 10 takes advantage of the implicit slack in the I/O schedule to schedule additional I/Os. Scheduler 10 finds a pool with the lowest measured statistic for fair sharing, finds a session with the lowest measured statistic for fair sharing in that found pool, and schedules an I/O from that found session.

When an inactive session becomes active, a combination of a measured statistic such as, for example, an approximately five-second moving average with the approach of scheduler 10 of selecting a pool and a session with a lowest average implies that the selected session preferentially get extra performance until the selected has "caught up" with other sessions. However, scheduler 10 quickly dampens this transient effect.

Additional methods of fair sharing may be used by scheduler 10 such as, for example, proportional shares or equal increments over reserve. Other algorithms to choose the pools 210 and sessions 205 that receive unused resources may replace the method of achieving fair sharing by scheduler 10.

Scheduler 10 selects I/Os for different sessions 205 and determines when to send these selected I/Os to the storage device 20 for execution, as shown in FIG. 2. Scheduler 10 operates each time an I/O arrives or completes. Scheduler 10 further operates when the release time or deadline passes for an I/O queued in any of the sessions 205.

Scheduler 10 restricts the number of I/Os outstanding at the storage device 20 in the storage device queue 215 to balance device efficiency with accurate scheduling. Disk head schedulers in particular are more efficient with a choice of more I/Os from which to select, especially if they can process additional adjacent I/Os without a head seek. However, scheduler 10 has no control over I/Os once it sends them to the storage device 20. Consequently, if scheduler 10 sends several I/Os before the deadline associated with the I/Os and subsequently an I/O with a short deadline arrives at the storage device queue 215, the I/O with the short deadline may be delayed past its deadline.

FIG. 3 illustrates a method 300 of operation of system in managing resources with respect to limits, reserves, and fair sharing. While described in terms of individual I/Os, it should be clear that method 300 applies to batches of I/Os as well. Each time scheduler 10 runs, scheduler 10 enters a loop to schedule as many I/Os as possible. Scheduler 10 selects an I/O to transfer to the tail of the storage device queue 215 (method 400, FIG. 4). Method 300 proceeds to decision block 302 and inquires if method 400 returned an I/O. If it did, method 300 proceeds to step 305. When scheduler 10 sends an I/O to the storage device queue 215, scheduler 10 transfers the selected I/O to the tail of the storage device queue (step 303), and updates the pool reserve bucket, the pool limit bucket, and statistics accumulated by the pool fair share estimator for the pool of the transferred I/O (step 305). Scheduler 10 updates the session reserve bucket, the session limit bucket, and statistics accumulated by the session fair share estimator for session of the transferred I/O (step 310). If at step 302 method 300 determines that method 400 did not return an I/O, it proceeds to step 325 as described below in more detail.

Scheduler 10 determines whether the number of I/Os in the storage device queue 215 is less than the maximum allowed number of I/Os (decision step 315). If yes, scheduler 10 determines if additional I/Os have a release time that has passed (decision step 320). If yes, scheduler 10 returns to step 400. If no, scheduler 10 pauses and arranges to wake up at the earliest deadline or release time of any I/O queued in any session, if there is one (step 325), or when new I/Os arrive at the computer 15, or when I/Os complete at the storage device 20. If the number of I/Os in the storage device queue 215 is not less than the maximum allowed (decision step 315), scheduler 10 proceeds to step 325. On wake up at step 325, scheduler 10 returns to step 400.

Figure 4A:
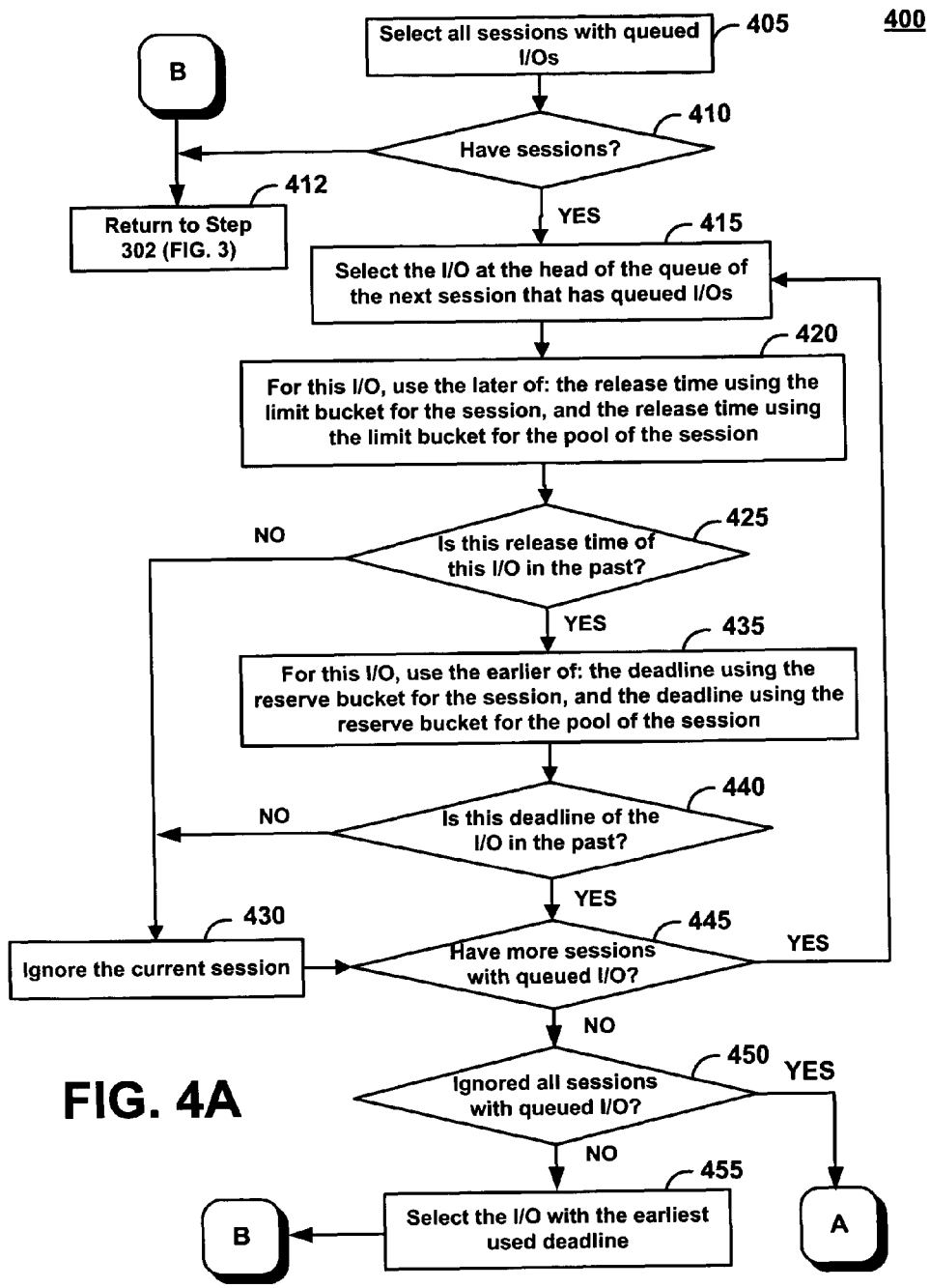
FIG. 4 comprises FIGS. 4A and 4B, and represents a process flow chart illustrating a method of operation of scheduler of FIGS. 1 and 2 in selecting an I/O for transfer to a storage device queue.
Figure 4B:
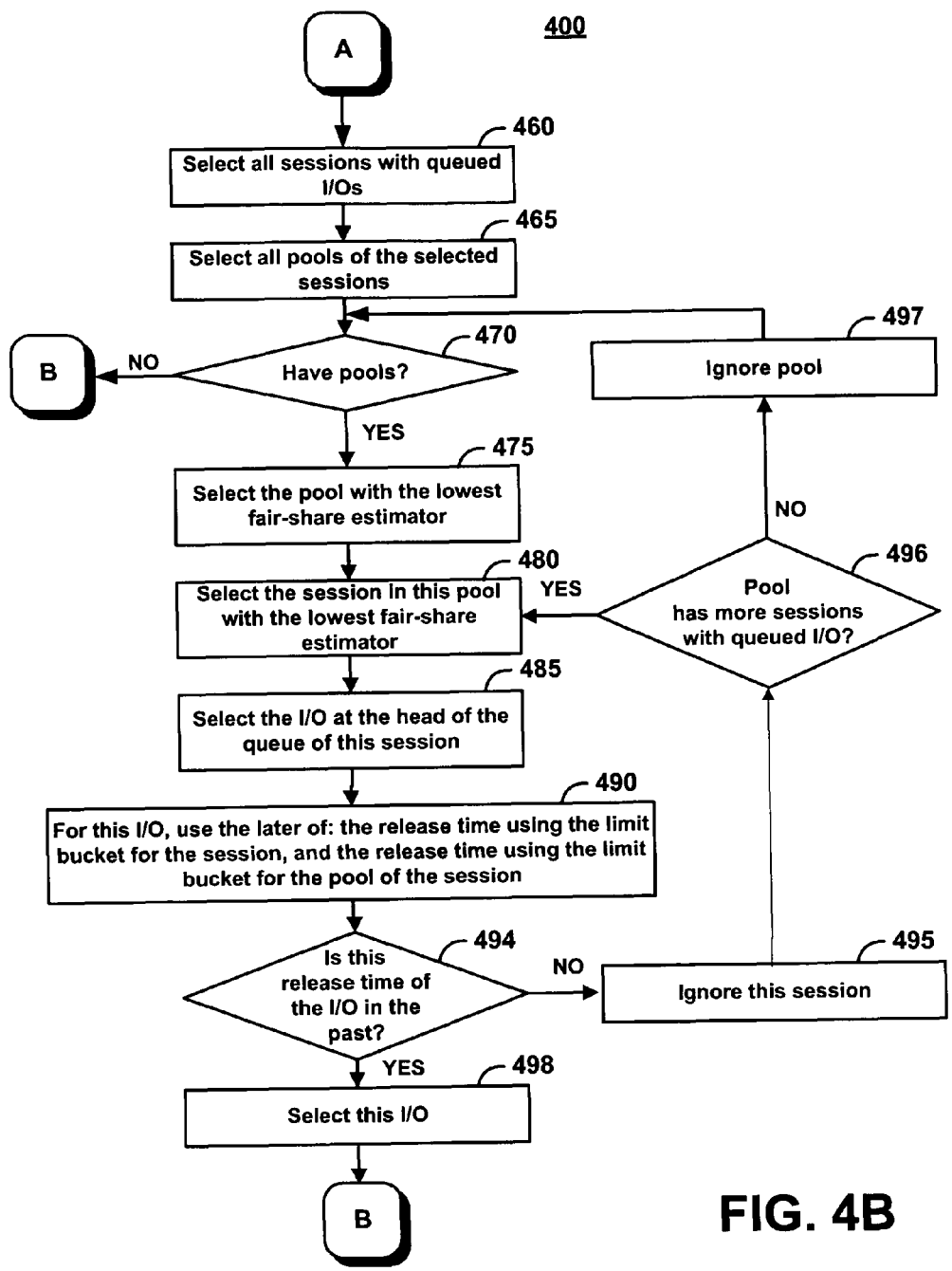
Figure 5:
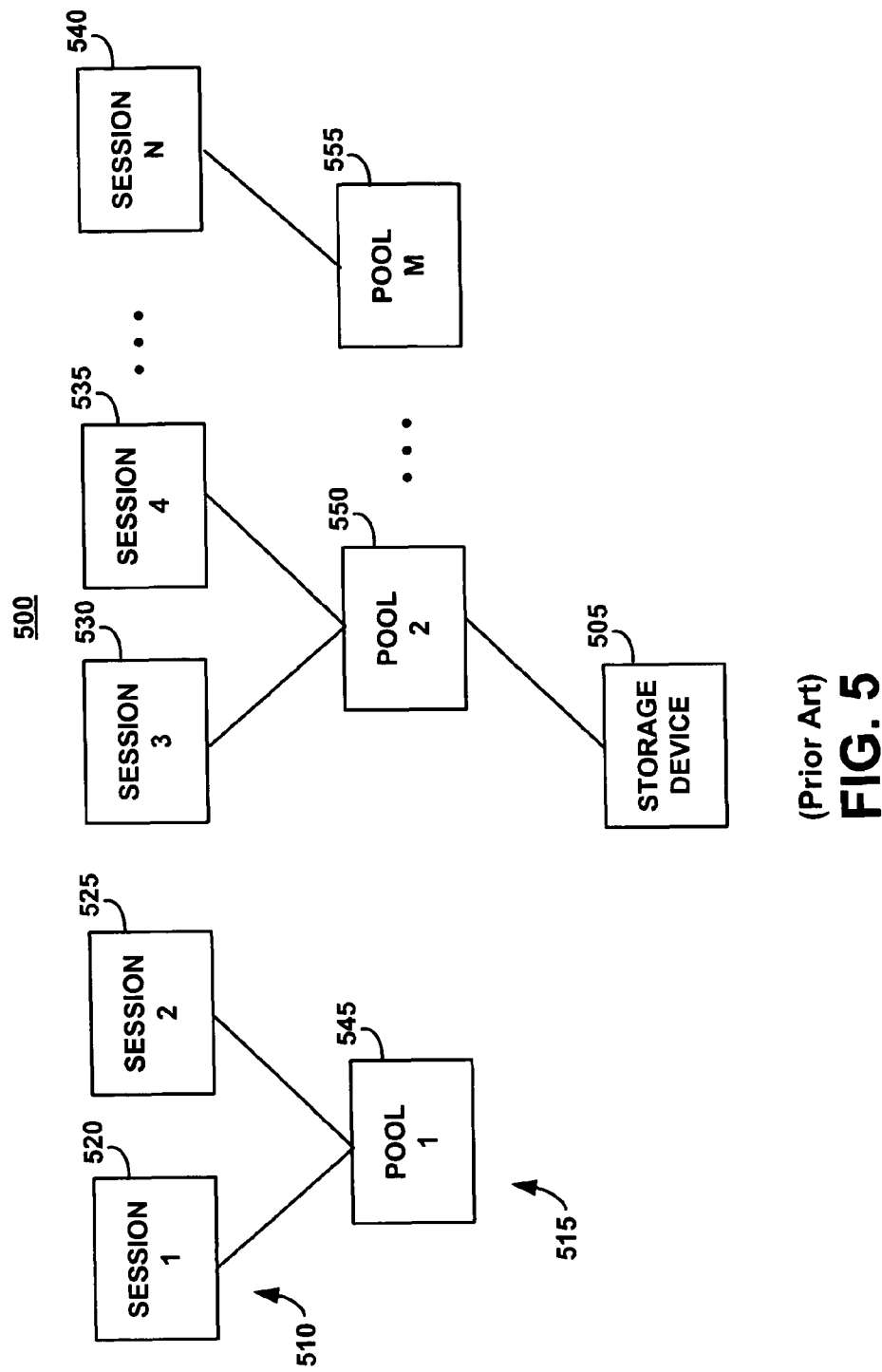
FIG. 5 is a schematic illustration portraying the operation of a conventional storage system environment.

FIG. 4 illustrates a method 400 of operation of system in selecting an I/O for transfer to the storage device queue 215. Scheduler 10 selects all sessions 205 that have I/Os in their queues (step 405). Scheduler 10 then determines at step 410, if it has selected any sessions. If not, scheduler 10 returns control to step 302 of method 300 (step 412).

If at step 410, scheduler 10 determines that it has selected a session, then scheduler 10 selects the next session that has queued I/O, and selects the head I/O of the queue of this session (step 415). For the I/O selected at step 415, scheduler 10 computes, at step 420, two release times using the limit bucket 260 for this session and the limit bucket 270 for the pool of this session, and uses the later of the two as the release time.

Scheduler 10 determines at decision step 425 if the release time (step 420) is in the past. If not, scheduler 10 ignores this session (step 430). If the release time is determined to be in the past for the selected I/O, scheduler 10 computes two deadlines using the reserve bucket 265 for the session and the reserve bucket 275 for the pool of the session, and uses the earlier of the two as the deadline (step 435). Scheduler 10 then determines at decision step 440, if this deadline is in the past. If not, scheduler 10 ignores this session (step 430).

Scheduler 10 repeats steps 415 through 440 until no additional sessions that have queued I/Os remain for processing (step 445). Scheduler 10 then determines at decision step 450 if it has ignored all sessions that have queued I/Os. If not, scheduler 10 selects, at step 455, the head I/O that has the earliest deadline of all head I/Os of all non-ignored sessions that have queued I/Os, and returns to step 305 of method 300 (step 412). If scheduler 10 determines at decision step 450 that it has ignored all sessions that have queued I/Os, scheduler 10 proceeds to step 460.

At step 460, scheduler 10 selects all sessions 205 that have I/Os in their queues, and further selects at step 465, all pools 210 of these sessions. At step 470, scheduler 10 determines if it has more pools. If not, it returns to step 305 of method 300 (step 412). If it does, scheduler 10 selects the pool with the least amount of recent I/O traffic according to the pool fair share estimator (step 475).

At step 480, scheduler 10 selects the session in this pool with the least amount of recent I/O traffic according to the session fair share estimator. At step 485, scheduler 10 selects the head I/O from the queue of the selected session. For the selected I/O, scheduler 10 computes two release times using the limit bucket 260 for this session and the limit bucket 270 for the pool of this session, and uses the later of the two as the release time (step 490).

Scheduler 10 determines, at decision step 494 if this release time is in the past. If it is, scheduler 10 selects this I/O (step 498) and returns control to step 305 of method 300. If not, scheduler 10 ignores this session (step 495), and determines, at step 496, if this pool has more sessions that have queued I/Os. If it does, scheduler 10 proceeds to step 480. If not, scheduler 10 ignores this pool at step 497, and proceeds to step 470.

In one embodiment, scheduler 10 performs a modified EDF algorithm to select an I/O with an expired deadline. For each of the sessions 205 with a releasable I/O, scheduler 10 assigns a deadline to the I/O that is the earlier of the deadline given by the session reserve bucket of the selected session and the deadline given by the pool reserve bucket of the pool of the selected session. By assigning the earlier of the two deadlines, scheduler 10 ensures that both the selected session and the pool associated with the selected session receive their reserves. Scheduler 10 selects the I/O with the earliest deadline, and queues the I/O at the storage device 20 if the deadline has expired. Waiting until deadlines have expired does not affect the average throughput of an I/O stream.

When running the modified EDF algorithm, scheduler 10 attempts to send batches of I/Os rather than single I/Os to help the device to take advantage of locality in the I/O stream of a session. To send batches of I/Os, scheduler 10 treats a run of up to, for example, approximately 32 KB of sequential I/Os in a session queue as a single I/O, counting them as a single I/O run for an associated session reserve buckets, session limit buckets, and measured statistics for fair sharing. Scheduler 10 also batches I/Os from one of the sessions 205 and sends these I/Os together to the storage device 20. The size of the batch is limited to the maximum of the number of releasable I/Os in the session queue and the session reserve rate r. Scheduler 10 thus batches at most one second of I/Os at the reserve rate, which can increase efficiency of the storage device 20 but can also increase the variability of service time. This applies to sessions 205 that have many I/Os in flight and are thus likely to be throughput sensitive rather than latency sensitive.

If scheduler 10 determines that all releasable I/Os have deadlines in the future, then scheduler 10 can take advantage of implicit slack in the schedule to insert additional I/Os ahead of those with deadlines. To accomplish this, scheduler 10 selects I/Os that achieve water-level fair sharing.

The performance management that scheduler 10 provides is useful for mixed workload, for example, when some of the sessions 205 have variable offered loads and other sessions 205 require steady throughput. Scheduler 10 supports mixed workloads by supporting throughput reserves and smoothing out variations in demand by enforcing limits and fair sharing.

Scheduler 10 supports soft real-time scheduling. As such, scheduler 10 guarantees that an average throughput meets the reserves specified for pools 210 and sessions 205 over a long term, but allow occasional violations in a short term.

Compared to conventional systems, scheduler 10 guarantees the fulfillment of reserves on average. Furthermore, scheduler 10 does not require detailed information (such as periodicities) about workloads of applications 40.

Scheduler 10 combines reserve and limit enforcement on I/O performance resource usage with fair sharing of best-effort resources. Scheduler 10 uses token buckets to track how close an application is to its limit and how far the application is operating below an allowable reserve. Scheduler 10 also maintains a recent performance measurement that is used by a fair share estimator to distribute any unused resources.

Scheduler 10 provides isolation between the pools of applications that share resources on a storage device and also between the sessions of clients of the same application through the enforcement of simple reserve and limit policies on performance resource allocation. Scheduler 10 guarantees a reserve I/O rate to each session and pool, limits each session and pool to a maximum I/O rate, and provides fair sharing of any available unused resources.

Scheduler 10 can be used as one of the building blocks to construct a large, scalable storage system that is built from small storage devices. Such a system can in turn be used to aggregate the data and workloads of additional applications onto a cluster of storage systems.

It is to be understood that the specific embodiments of the invention that have been described are merely illustrative of certain applications of the principle of the present invention. Numerous modifications may be made to the system and method for managing storage system performance as a resource described herein without departing from the spirit and scope of the present invention.

What is claimed is:

1. A processor-implemented method of managing a performance of a storage system as one or more resources that includes a plurality of pools and a plurality of sessions, the method comprising:
providing the plurality of pools,
wherein each of the pools is a long-term virtual entity that an administrator generates to manage a resource for one of a plurality of applications, and
wherein each of the pools comprises a pool limit bucket, a pool reserve bucket, and a plurality of pool statistics accumulated by a fair share estimator of the pool;
providing the plurality of sessions,
wherein each of the sessions is a short-term virtual entity that an application process creates from within each of the plurality of pools,
wherein each of the sessions comprises a session limit bucket, a session reserve bucket, and a plurality of session statistics accumulated by a fair share estimator of the session,
wherein each pool is uniquely associated with one or more sessions of the plurality of sessions;
generating, by each of two or more of the plurality of sessions, one or more I/Os;
iteratively selecting an I/O of the generated I/Os from one of the sessions to transfer to the tail of a storage device queue,
wherein the selected I/O is from a selected session of the plurality of sessions and the selected session is associated with a selected pool of the plurality of pools, and
wherein selecting an I/O of the generated I/Os is based on:
one of the pool limit bucket of the selected pool and the session limit bucket of the session, and
one of the pool reserve bucket of the selected pool and the session reserve bucket of the selected session, and
the fair share estimator of the selected pool and the fair share estimator of the selected session;
transferring the selected I/O to the tail of the storage device queue;
updating the pool reserve bucket, the pool limit bucket, and the plurality of pool statistics accumulated by the fair share estimator of the selected pool;
updating the session reserve bucket, the session limit bucket, and the plurality of session statistics accumulated by the session fair share estimator of the selected session;

storing a reserve value of one of the one or more of the resources in the pool reserve bucket and the session reserve bucket; and storing a limit value of one of the one or more resources in the pool limit bucket and the session limit bucket, wherein within each of the pools, each of the plurality of applications is subdivided into session resources in a corresponding pool assigned to the one of the plurality of applications, and wherein each of the sessions is associated with an instance of one of the plurality of applications that subdivides a resource allocation of one of the pools.

2. The method of claim 1, wherein selecting the I/O comprises examining the sessions to identify at least one of a candidate session with at least one I/O; and the method further includes:
measuring how much the session is operating below a predetermined reserve value; and
tracking how close a session is to a predetermined limit.

3. The method of claim 2, wherein selecting the I/O further comprises identifying a head I/O in the non-empty queue of the candidate session.

4. The method of claim 3, wherein selecting the I/O further comprises computing a deadline time by which the I/O is required to be executed for the candidate session and one of the pools to receive a predetermined reserve resource.

5. The method of claim 3, wherein computing the deadline for the identified head I/O comprises using a pool reserve bucket of the pool of the candidate session.

6. The method of claim 4, wherein selecting the I/O further comprises computing a release time for the identified head I/O using a session limit bucket of the candidate session, wherein the release time is a time after which the I/O can be executed without the candidate session and one of the pools exceeding a predetermined limit.

7. The method of claim 6, wherein computing the deadline for the identified head I/O comprises using a pool limit bucket of the pool of the candidate session.

8. The method of claim 6, wherein selecting the I/O further comprises selecting a head I/O with an earliest deadline that is past the release time, from a plurality of identified head I/Os.

9. The method of claim 8, wherein selecting the I/O further comprises transferring the selected candidate head I/O to the tail of the storage device queue, if the deadline of the selected candidate head I/O is in the past.

10. The method of claim 8, wherein selecting the I/O further comprises selecting one of the pools with a least amount of I/O traffic according to a pool fair share estimator, if the deadline of the selected candidate head I/O is not in the past.

11. The method of claim 10, further comprising selecting one of the sessions with the least amount of I/O traffic according to a session fair share estimator, from the sessions in the selected pool.

12. The method of claim 10, wherein selecting the I/O further comprises selecting a head I/O from a queue in the selected session according to a session fair share estimator.

13. The method of claim 12, wherein selecting the I/O further comprises transferring the selected head I/O to the tail of the storage device queue.

14. A computer processor-implemented system for managing a performance of a storage system as one or more resources that includes a plurality of pools and a plurality of sessions, the system comprising:

a scheduler including a computer processor configured to perform a method comprising:
providing the plurality of sessions,
wherein each of the sessions is a short-term virtual entity that an application process creates from within each of the plurality of pools,
wherein each of the sessions comprises a session limit bucket, a session reserve bucket, and a plurality of session statistics accumulated by a fair share estimator of the session,
wherein each pool is uniquely associated with one or more sessions of the plurality of sessions;
generating, by each of two or more of the plurality of sessions, one or more I/Os;
iteratively selecting an I/O of the generated I/Os from one of the sessions to transfer to the tail of a storage device queue,
wherein the selected I/O is from a selected session of the plurality of sessions and the selected session is associated with a selected pool of the plurality of pools, and
wherein selecting an I/O of the generated I/Os is based on:
one of the pool limit bucket of the selected pool and the session limit bucket of the session, and
one of the pool reserve bucket of the selected pool and the session reserve bucket of the selected session, and
the fair share estimator of the selected pool and the fair share estimator of the selected session;
transferring the selected I/O to the tail of the storage device queue;
updating the pool reserve bucket, the pool limit bucket, and the plurality of pool statistics accumulated by the fair share estimator of the selected pool;
updating the session reserve bucket, the session limit bucket, and the plurality of session statistics accumulated by the session fair share estimator of the selected session;
storing a reserve value of one of the one or more of the resources in the pool reserve bucket and the session reserve bucket; and
storing a limit value of one of the one or more resources in the pool limit bucket and the session limit bucket,
wherein within each of the pools, each of the plurality of applications is subdivided into session resources in a corresponding pool assigned to the one of the plurality of applications, and
wherein each of the sessions is associated with an instance of one of the plurality of applications that subdivides a resource allocation of one of the pools.

15. The system of claim 14, wherein the scheduler selects the I/O by examining the sessions to identify at least one of a candidate session with at least one I/O;

and the scheduler further:
measures how much one of the sessions is operating below a predetermined reserve value; and
tracks how close one of the sessions is to a predetermined limit.

16. The system of claim 15, wherein the scheduler selects the I/O by identifying a head I/O in the non-empty queue of the candidate session.

17. The system of claim 16, wherein the scheduler selects the I/O by computing a deadline time by which the I/O is required to be executed for the candidate session and one of the pools to receive a predetermined reserve resource.

18. The system of claim 17, wherein the scheduler selects the I/O further by computing a release time for the identified head I/O using a session limit bucket of the candidate session, wherein the release time is a time after which the I/O can be executed without the candidate session and one of the pools exceeding a predetermined limit.

19. A computer program product having program codes stored on a non-transitory computer-usable storage medium for managing a performance of a storage system as one or more resources that includes a plurality of pools and a plurality of sessions that, when executed by a processor, perform a method, the method comprising:
   providing the plurality of pools,
      wherein each of the pools is a long-term virtual entity that an administrator generates to manage a resource for one of a plurality of applications, and
      wherein each of the pools comprises a pool limit bucket, a pool reserve bucket, and a plurality of pool statistics accumulated by a fair share estimator of the pool;
   providing the plurality of sessions,
      wherein each of the sessions is a short-term virtual entity that an application process creates from within each of the plurality of pools,
      wherein each of the sessions comprises a session limit bucket, a session reserve bucket, and a plurality of session statistics accumulated by a fair share estimator of the session,
      wherein each pool is uniquely associated with one or more sessions of the plurality of sessions;
   generating, by each of two or more of the plurality of sessions, one or more I/Os;
   iteratively selecting an I/O of the generated I/Os from one of the sessions to transfer to the tail of a storage device queue,
      wherein the selected I/O is from a selected session of the plurality of sessions and the selected session is associated with a selected pool of the plurality of pools, and
      wherein selecting an I/O of the generated I/Os is based on:
         one of the pool limit bucket of the selected pool and the session limit bucket of the session, and
         one of the pool reserve bucket of the selected pool and the session reserve bucket of the selected session, and
         the fair share estimator of the selected pool and the fair share estimator of the selected session;
   transferring the selected I/O to the tail of the storage device queue;
   updating the pool reserve bucket, the pool limit bucket, and the plurality of pool statistics accumulated by the fair share estimator of the selected pool;
   updating the session reserve bucket, the session limit bucket, and the plurality of session statistics accumulated by the session fair share estimator of the selected session
   storing a reserve value of one of the one or more of the resources in the pool reserve bucket and the session reserve bucket; and
   storing a limit value of one of the one or more resources in the pool limit bucket and the session limit bucket,
      wherein within each of the pools, each of the plurality of applications is subdivided into session resources in a corresponding pool assigned to the one of the plurality of applications, and
      wherein each of the sessions is associated with an instance of one of the plurality of applications that subdivides a resource allocation of one of the pools.

20. The computer program product of claim 19, wherein selecting the I/O comprises examining the sessions to identify at least one of a candidate session with at least one I/O; and the method further includes:
   measuring how much one of the plurality of sessions is operating below a predetermined reserve value; and
   tracking how close one of the plurality of sessions is to a predetermined limit.

21. The computer program product of claim 20, wherein selecting the I/O comprises identifying a head I/O in the non-empty queue of the candidate session.

22. The computer program product of claim 21, wherein selecting the I/O comprises for computing a deadline time by which the I/O is required to be executed for the candidate session and one of the pools to receive a predetermined reserve resource.

23. The computer program product of claim 22, wherein selecting the I/O comprises computing a release time for the identified head I/O using a session limit bucket of the candidate session, wherein the release time is a time after which the I/O can be executed without the candidate session and one of the pools exceeding a predetermined limit.

* * * * *